No. 764,091. PATENTED JULY 5, 1904.
G. W. WHITTEMORE.
VEHICLE TIRE.
APPLICATION FILED APR. 6, 1904.
NO MODEL.
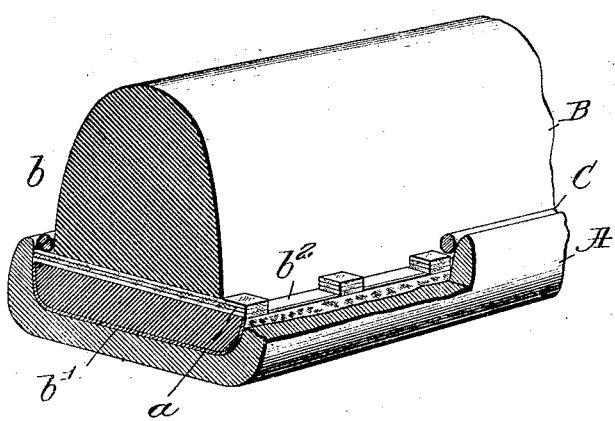
Witnesses:
Fred S. Greenleaf
Warren D. Owen
Inventor.
George W. Whittemore,
by Crosby Gregory
Attys No. 764,091. Patented July 5, 1904.

UNITED STATES PATENT OFFICE.

GEORGE W. WHITTEMORE, OF CAMBRIDGE, MASSACHUSETTS.

VEHICLE-TIRE.

SPECIFICATION forming part of Letters Patent No. 764,091, dated July 5, 1904.

Application filed April 6, 1904. Serial No. 201,799. (No model.)

*To all whom it may concern:*

Be it known that I, GEORGE W. WHITTEMORE, a citizen of the United States, residing at Cambridge, in the county of Middlesex and State of Massachusetts, have invented an Improvement in India-Rubber Vehicle-Tires, of which the following description, in connection with the accompanying drawings, is a specification, like letters on the drawings representing like parts.

This invention has for its object the production of a novel tire for wheels, my aim being to increase the durability of the tire.

Heretofore tires composed of india-rubber have been clamped in the channel of channel-iron by outside retaining-wires, the latter contacting with transverse or cross metallic pins held in said tires.

In practice it has been found that the abrasion of the metallic retaining-wires with the metallic cross-pins results in so wearing the retaining-wires where they contact with said cross-pins that the retaining-wire is weakened and frequently breaks, which results in releasing the tire. So, also, the cross-pins, as the retaining-wires wear into the same, fail to seat the base of the rubber tire snugly in the channel of the channel-iron, and, further, in use the jar to which the metallic cross-pins are subjected results in loosening said pins in the tire, so that they are liable to drop out when for any reason the tire is removed from the channel-iron.

A tire composed substantially throughout of homogeneous rubber has great practical advantage over a tire the face of which is of rubber and the base of layers of woven fabric vulcanized and attached to the face, for the reason that when the tire and base are of homogeneous rubber the tire when being applied to the channel-iron preparatory to receiving the outside retaining-wires may be compressed—that is, shortened beyond its normal length—which after the retaining-wires have been applied to hold the tire in place results in greater resiliency for the tire, and such a tire will last longer than one which is applied in a stretched condition.

In my improved tire I employ a series of non-metallic strips extended transversely of the tire, their ends being exposed at the shoulder or flange which is overlapped by the retaining-wires. These non-metallic strips composed of fabric are vulcanized in the rubber of the tire and become permanently incorporated therewith, so that they cannot possibly be detached, nor can they slip in any way in use. The ends of these non-metallic strips exposed at the flange of the tire occupy, preferably, such position with relation to said rim that the upper sides of the strips stand flush with or a little above the face of the flange which is overlapped by the outside wires. The outside wires contacting with the strips are not worn in use, nor are the strips worn and cut off, for they yield somewhat to the underlying rubber base below them, and these non-metallic strips being separated one from the other and being wholly concealed in the rubber of the tire, with the exception of their ends, which are extended through the tire and are sustained in or by the flange. Said strips being exposed in the flange to receive the retaining-wires enables the tire to be compressed, as stated, when being applied to the channel-iron.

Referring to the drawing, A represents part of a channeled iron which is applied to the felly of a wheel to receive the tire B. This tire comprises an exterior or tread surface $b$. I mean thereby the part of the tire that extends beyond the edges of the channel-iron and a base $b'$, the base being sufficiently wider than the tread to leave flanges $b^2$. The tread, base, and flanges are of india-rubber, preferably homogeneous in quality, so that the base as well as the tread may yield to pressure as the wheel having the tire rolls over the road.

To confine the tire to the channel-iron, I employ outside retaining-wires C.

My invention resides chiefly in the insertion in the body of the tire transversely thereof of a series of non-metallic cross-strips $a$, said strips being exposed at the surface of the flange $b^2$. Preferably the non-metallic strips will be composed of cloth impregnated with india-rubber and will be vulcanized into the rubber of the tire during the manufacture thereof, so that said strips will thoroughly incorporate with and cannot become loosened or detached from the tire. The upper sides of the ends of these strips are shown as exposed to be acted upon by the retaining-wires C, and the said upper sides are and will be either flush with or located somewhat above the surface of the flange $b^2$. By locating the upper sides of the non-metallic strips slightly above the india-rubber forming the flange the strain of the retaining-wires on the tire to retain the same in the channel-iron is applied chiefly to the non-metallic strips, thus relieving the india-rubber part of the flange from contact with the tire.

Having described my invention, what I claim as new, and desire to secure by Letters Patent, is—

1. A tire having its tread and base composed of india-rubber shaped to form a flange, and a series of non-metallic strips vulcanized in the tire, said strips being exposed in the flange to be acted upon by the retaining-wire employed to retain the tire in the usual channel-rim.

2. An india-rubber tire having side flanges, and provided at intervals with cross-strips of cloth vulcanized into the body of the tire and exposed near their ends above said flanges, and means for retaining the tire on a channel-rim.

3. A channel-rim having an applied tire of substantially homogeneous india-rubber capable of being compressed throughout its length when being laid in the channel, said tire having flanges at its sides and presenting a series of transverse non-metallic strips extended therethrough and wholly surrounded by the rubber of the tire except at the ends of said strip, said ends being exposed at the flanges of the tire, and outside holding-wires overlying the ends of said strips and retaining the compressed tire in place with a normal tendency to expand in the direction of its length.

In testimony whereof I have signed my name to this specification in the presence of two subscribing witnesses.

GEORGE W. WHITTEMORE.

Witnesses:
GEO. W. GREGORY,
MARGARET A. DUNN.